United States Patent [19]
Dugan et al.

[11] Patent Number: 4,592,720
[45] Date of Patent: Jun. 3, 1986

[54] DEVICE FOR REHEATING AND BLOW MOLDING PARISONS

[75] Inventors: Larry M. Dugan, Boulder; Bruce A. Moen, Golden; David E. Rasmussen, Thornton; Christopher S. Derks; Richard L. Szabo, both of Arvada; William C. Carlsen, Wheat Ridge; Robert J. DeRoche, Lakewood; James W. Ditto, Golden, all of Colo.

[73] Assignee: Adolph Coors Company, Golden, Colo.

[21] Appl. No.: 684,670

[22] Filed: Dec. 21, 1984

[51] Int. Cl.$^4$ .................... B29C 49/00; B29C 49/64
[52] U.S. Cl. .................... 425/526; 264/535; 425/529; 425/534; 425/540
[58] Field of Search ............ 425/522, 507, 526, 508, 425/529, 535, 534, 538, 540, 174.4; 264/535

[56] References Cited
U.S. PATENT DOCUMENTS

| | | | |
|---|---|---|---|
| 3,307,726 | 3/1967 | Cleereman | 264/312 |
| 3,356,242 | 12/1967 | Cleereman | 264/310 |
| 3,371,387 | 3/1968 | Cleereman et al. | 425/590 |
| 3,389,934 | 6/1968 | Sully | 297/42 |
| 3,401,427 | 9/1968 | Cleereman et al. | 425/575 |
| 3,409,709 | 11/1968 | Cleereman et al. | 264/40.2 |
| 3,500,503 | 3/1970 | Cleereman et al. | 425/227 |
| 3,752,625 | 8/1973 | Van Manen | 425/538 |
| 3,819,314 | 6/1974 | Marcus | 425/534 |
| 3,830,893 | 8/1974 | Steingiser | 425/529 |
| 4,036,925 | 7/1977 | Kauffman et al. | 425/540 |
| 4,083,568 | 4/1978 | Lane et al. | 425/435 |
| 4,122,138 | 10/1978 | Cleereman et al. | 264/25 |
| 4,147,487 | 4/1979 | Dickson et al. | 425/526 |
| 4,204,111 | 5/1980 | Yonko | 425/526 |
| 4,214,860 | 7/1980 | Kleimenhagen et al. | 425/540 |
| 4,451,426 | 5/1984 | Branchadell | 264/535 |

Primary Examiner—Jay H. Woo
Assistant Examiner—Timothy W. Heitbrink
Attorney, Agent, or Firm—Klaas & Law

[57] ABSTRACT

A reheating and blow molding system utilizing an indexing plate having pairs of core pins mounted on the periphery. Radiant heaters heat parisons mounted on the core pin to a temperature suitable for blow molding while the parisons are rotated in response to movement of a spin belt. Rotation of the parisons during heating provides greater uniformity of heating. Tapered shanks remove the core pins from core pin holders and dispose the parisons in a mold for blow molding. The core pins are then disposed in the core pin holders and indexed to a subsequent indexing location where the finished article is removed.

17 Claims, 4 Drawing Figures

DEVICE FOR REHEATING AND BLOW MOLDING PARISONS

BACKGROUND OF THE INVENTION

The present invention pertains generally to apparatus and methods for molding plastic articles and more particularly to blow molding parisons which are formed in a molding with rotation process. The molding with rotation process is described in U.S. Pat. Nos. 3,307,726; 3,356,242; 3,371,387; 3,389,934; 3,401,427; 3,409,709; 3,500,503; and 4,083,568, which are specifically incorporated herein by reference and form a part of this disclosure for all that they teach.

Molding with rotation, such as disclosed in the U.S. patent application Ser. No. 684,673 filed on even date herewith by Roger Alan Hahn and Bruce Allen Moen entitled "Flash Suppression for Molding with Rotation" which is incorporated herein by reference and forms a part of this disclosure for all that it teaches, involves injection molding of a plastic article, such as a plastic parison formed between a rotating mandrel or core pin and a stationary mold cavity. The core pin is rotated during injection molding to impart a preferred orientation to long chains of molecules in the polymer, such as described in U.S. Pat. No. 3,307,726. The molded article thus possesses improved strength characteristics in the longitudinal and transverse directions due to the bi-axial orientation of the polymer chains in the parison. The parison, or preform, is then blow molded into the reform, i.e., the finished article such as a plastic bottle or plastic can.

Two processes exist for blow molding; the integrated and nonintegrated process. In accordance with the integrated process, the parison is formed by injection molding as disclosed above and the parison is blown with air and expanded against a female mold member while it is still warm from the injection molding process, such as described in U.S. Pat. Nos. 3,752,625 and 3,819,314, which are incorporated herein, and form a part of this disclosure, for all that they teach. The integrated molding with rotation and blow molding process suffers from several disadvantages and limitations. A high degree of complexity and technical difficulty exists in molding with rotation in an integrated process. For example, a much higher pin temperature is required in the integrated process which increases the temperature of the flash seal, and consequently, adversely affects its ability to suppress flash. In the nonintegrated process of reheating and blow molding, much cooler pin temperatures are utilized and, consequently, much cooler temperatures exist in the flash seal which improves its ability to suppress flash.

Additionally, the integrated process does not provide sufficient isolation between the processes of molding with rotation and blow molding to provide a sufficient amount of independent and versatile control over the automated system. For example, it is necessary to provide a significant equilibration time for the parison to reach a temperature for blow molding. In the integrated process, the pin is held at a temperature at which parison is blow molded to ensure that no discontinuity in temperature exists as a result of contact with the core pin. This high temperature at which the core pin is held greatly increases equilibration time and can significantly reduces the operating speed of the automated process. Otherwise, the blow molding process can be operated at a higher parison temperature which results in a weaker quality article. In the nonintegrated process, the parison can be blow molded at a lower temperature, resulting in a stronger quality article. Moreover, the operational speed of the automated process need not be limited to provide the time for the temperature of the parison to equilibrate.

Furthermore, the reliability of an integrated system is greatly reduced by the complexity and technical difficulty of achieving a commercially viable automated integrated system. The technical requirement of providing a molding with rotation system in conjunction with a blow molding system which can operate at high speeds results in a device with low reliability and high cost.

The nonintegrated process involves molding with rotation and storage of the parisons produced in the molding with rotation process for later reheating and blow molding. The nonintegrated process provides a system which is less complex, provides sufficient isolation between the processes to blow mold at lower temperatures so as to provide stronger products, and allows the molding with rotation seal to operate at lower temperatures to more readily suppress flash. However, the prior art methods of heating parisons have been nonuniform and have resulted in a finished article of weaker quality. For example, conduction heating through a pin holding the parison has been utilized in prior art designs. In the integrated process, heat conduction between the pin and the parison results in sufficiently uniform heating because the parison is form fitted on the pin during the injection molding process. In the nonintegrated process, contact between the parison and the pin is not sufficiently consistent to provide uniform heating because the parison is removed from the core pin used for injection molding and placed on another pin for blow molding. The nonuniform temperature of the parison during the blow molding process results in a weaker quality article.

OBJECTS OF THE INVENTION

It is therefore an object of the invention to provide an improved system of blow molding articles.

It is also an object of the present invention to provide a device for reheating and blow molding parisons.

Another object of the present invention is to provide a device for reheating and blow molding parisons which is reliable in operation.

Another object of the present invention is to provide a device for reheating blow molding parisons which is inexpensive to implement.

Another object of the present invention is to provide a device for reheating blow molding parisons which can be implemented in a high speed, commercially automated process.

Another object of the present invention is to provide a device for reheating and blow molding parisons which produces strong quality articles.

Another object of the present invention is to provide a device for reheating and blow molding parisons which is simple to implement in a high speed, commercially automated process.

Another object of the present invention is to provide a method of blow molding plastic parisons.

Additional objects, advantages and novel features of the invention are set forth in part in the description which follows and will be understood by those skilled in the art upon examination of this application, or may be learned by practice of the invention. The objects and advantages of the invention may be realized and obtained by means of the instrumentalities in combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a device for reheating and blow molding parisons comprising: core pin means for holding preheated parisons with a minimum transfer of heat by thermal conduction and having a central opening for applying air to the parisons for blow molding; core pin holder means having a tapered central opening for holding the core pin means by a nonlocking taper; means for coupling the core pin holder means to an indexing dial plate to allow rotation of the core pin holder means in the dial plate; means for indexing the dial plate in a series of discrete steps to progressive indexing locations; means for rotating the core pin holder means; means for radiantly heating the preheated parisons while the parisons are rotating to uniformly heat the preheated parisons to a temperature suitable for blow molding; tapered shank means which forms a nonlocking taper with the central opening of the core pin means, the tapered shank means having a fluid passage for applying pressurized fluid to the central opening of the core pin means for blow molding; carriage assembly means for moving the shank means through the central opening of the core pin holder means to remove the core pin means from the core pin holder and to position the core pin means in a blow mold; preloaded spring means for providing a predetermined force between the tapered shank means and the core pin means independent of pressure applied to the carriage assembly means to seat the tapered shank means in the core pin means and provide an air tight seal; fluid reservoir means for providing a supply of pressurized fluid for blow molding.

The present invention may also comprise a device in a system for reheating and blow molding parisons comprising: a core pin holder having a tapered central opening; means for rotating the core pin holder by positioning a moving spin belt on the core pin holder; tapered core pin means disposed in the central opening of the core pin holder to form a nonlocking tapered matching interface, the tapered core pin means having a tapered central opening; shank means having a tapered end which mates with the tapered central opening of the core pin means to provide a nonlocking interface, the shank means having an air passage for applying pressurized air to the core pin means to blow mold parisons; carriage assembly means for moving the shank means through the central opening of the core pin holder to remove the core pin means from the core pin holder and position the core pin means in a blow mold; since preloaded spring means for providing a predetermined force between the shank means and the core pin means independent of pressure applied to the carriage assembly means to seat the shank means in the core pin means with said predetermined force and provide an air tight seal.

The present invention may also comprise a device in a system for reheating blow molding parisons comprising: an indexing plate; core pin holder means coupled to the indexing plate to allow rotation of the core pin holder means in the indexing plate, the core pin holder means having a central opening with a first predetermined taper; core pin means disposed within the core pin holder means having a taper which mates with the predetermined taper of the core pin holder means to provide a nonlocking interface, the core pin means having a central opening with a second predetermined taper; shank means having a tapered end which mates with the core pin means to provide a nonlocking interface, the shank means having a fluid passage for applying pressurized fluid to the core pin means to blow mold the parisons; carriage assembly means for moving the shank means through the core pin holder means to remove the core pin means from the core pin holder means and position the core pin means in a predetermined location; preload spring means for coupling the shank means to the carriage assembly means; tapered collar means disposed on the core pin means to move the core pin means from the predetermined location upon closing of a molding cavity having a mating taper to force the core pin means onto the shank means with a predetermined pressure determined by the preload spring means independently of pressure applied to the carriage assembly means.

The present invention may also comprise a device for blow molding plastic parisons comprising: core pin means for holding preheated parisons with a minimum transfer of heat by conduction and providing an air passage to blow mold parisons mounted thereon; core pin holder means having an opening in which the core pin means are disposed; a dial plate; bearing means for coupling the dial plate and the core pin holder means to allow rotation of the core pin holder means in the dial plate; means for indexing the dial plate in a series of discrete steps to progressive indexing locations; means for rotating the core pin holder means at predetermined indexing locations at a predetermined rotational speed; means for radiantly heating plastic parisons disposed on the core pin means while the parisons are rotating at the predetermined indexing locations at the predetermined rotational speed which is sufficiently high to uniformly heat the parisons; blow molding cavity means disposed in relationship to an additional predetermined indexing location; tapered shank means for removing the core pin means from the core pin holder means and disposing the core pin means in the blow molding cavity means with sufficient force to provide an air seal between the core pin means and the tapered shank means, the tapered shank means having an air passage for applying pressurized fluid to the core pin means to blow mold the parison when the core pin means is disposed in the blow molding cavity means and for removing the core pin means from the blow molding cavity means and disposing the core pin means in the core pin holder means after blow molding; reservoir means for supporting the blow molding cavity means and storing pressurized fluid used for blow molding.

The present invention may also comprise a method of blow molding plastic parisons comprising: placing parisons on core pins; providing core pin holders in which the core pins are disposed; coupling the core pin holders to a dial plate to allow rotation of the core pin holders in the dial plate; indexing the dial plate in a series of discrete steps to progressive indexing locations; rotating the core pin holders at predetermined indexing locations; radiantly heating the plastic parisons at the predetermined locations while the parisons are rotating to uniformly heat the parisons to a temperature suitable for blow molding; removing the core pins from the core pin holders with a tapered shank; disposing the core pins in a blow molding cavity using the tapered shank; applying pressurized fluid through the tapered shank and the core pins to blow mold the parisons; disposing the core pins in the core pin holders after blow molding.

The present invention may also comprise a device for blow molding parisons comprising: a core pin having a surface formed of a material having a low heat conductivity; core pin holder means for holding the core pins in a nonlocking taper; means for radiantly heating the parisons disposed on the core pins to a temperature suitable for blow molding; means for rotating the core pin holders while the parisons are being radiantly heated to provide uniform heating of the parisons; means for removing the core pin from the core pin holder means and placing the core pin in a molding cavity for blow molding and disposing the core pin in the core pin holder means after blow molding.

The advantages of the present invention are that it provides a two step, or nonintegrated process, where parisons are formed in a separate molding with rotation device which provides better suppression of flash. Isolation of the molding with rotation process from the blow molding process provides more independent and versatile control over the entire system producing an article of stronger quality in a high speed, commercially viable automated system. The precise timing required between molding with rotation and blow molding in the integrated process to ensure the proper temperature for blow molding is not required in the non-integrated process of the present invention. Moreover, radiant heat is used to uniformly heat the parisons while they are rotating in the automated process of the present invention to provide uniform heating, which has not been previously achievable in nonintegrated systems using conduction type heating. Additionally, a simple structure is used to both hold and rotate the parison core pins at the heating indexing location. A nonlocking taper is provided between the core pin and the holder to allow a shank to remove the core pin and insert the parison in the mold for blow molding by passing air through a central opening in the tapered shank and core pin. This simple and unique structure provides a device for reheating and blow molding parisons in a high speed, reliable and commercially viable automated system.

BRIEF DESCRIPTION OF THE DRAWINGS

An illustrative and presently preferred embodiment of the invention is shown in the accompanying drawings wherein.

DETAILED DESCRIPTION OF THE INVENTION

Figure 1:
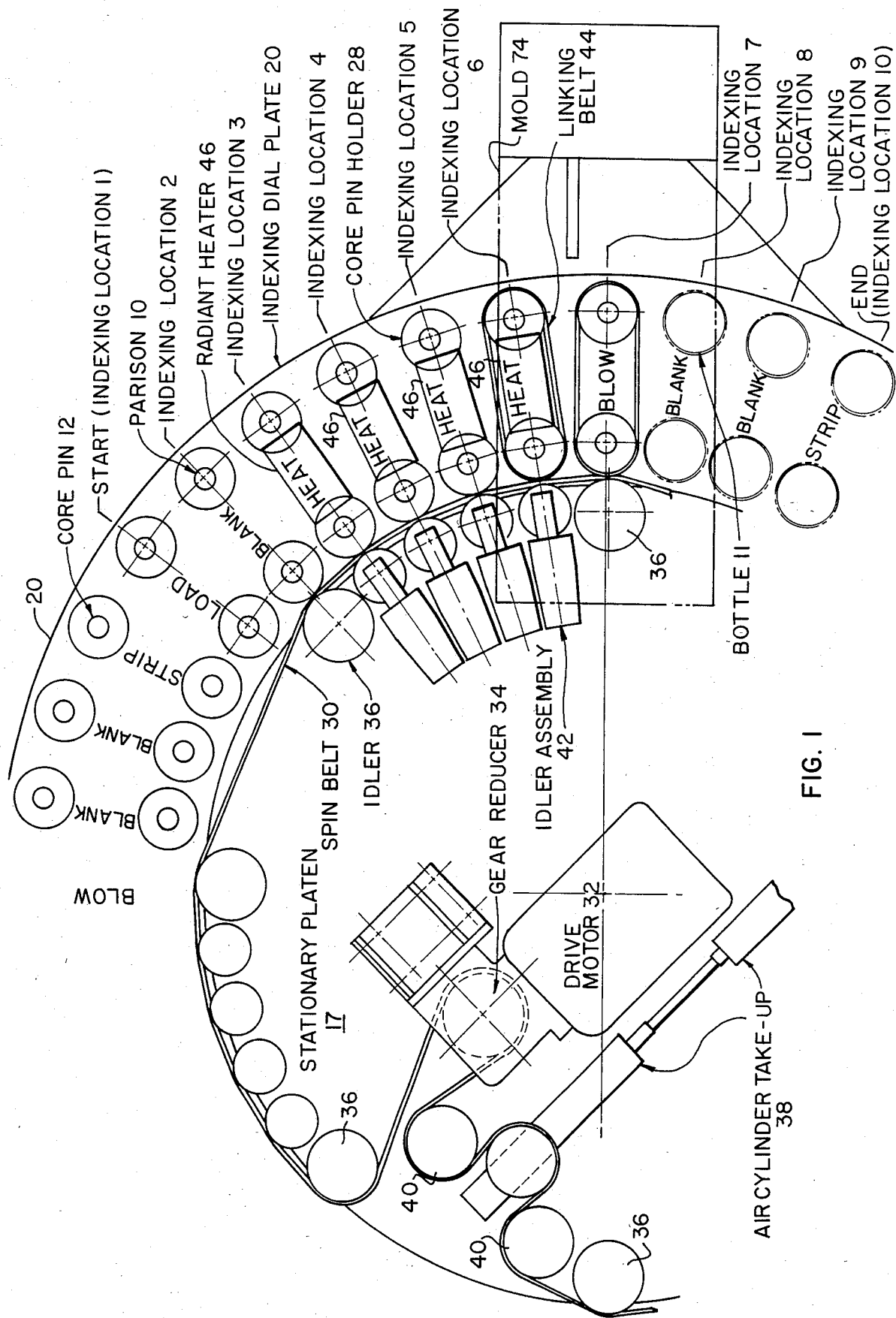
FIG. 1 is a schematic plan view of a portion of the device of the present invention.

Generally, the present invention comprises a device for blow molding preforms, i.e., plastic parisons which are formed in a molding with rotation device such as described in the above referenced U.S. patents. The present invention blow molds the plastic parisons into a reform, i.e., a finished article such as a plastic bottle or plastic can, such as disclosed in U.S. Pat. Nos. 4,122,138; 3,752,625; and 3,819,314, which are incorporated herein by reference and form a part of this disclosure for all that they teach.

As illustrated in the various drawings, the present invention includes tapered core pin means which comprise a core pin 12 and an adapter 14 having a tapered central opening 15, a tapered surface 88 and a fluid passage 86. Core pin 12 has a surface formed from a material which has low thermal conduction properties such as silicon, neoprene, a heat resistant rubber, a ceramic, or an elastomer polymer material. A means for coupling, or bearing means, comprise bearing 16, snap rings 18 and 82 and races 80. Indexing dial plate 20 is coupled to a means for indexing comprising indexer drive motor 22, indexer 24 and indexer support 26. Core pin holder means comprise core pin holder 28 having a tapered central opening 29. Means for rotating comprise spin belt 30, spin belt drive motor 32, gear reducer 34, idler 36, air cylinder take-up 38 and pulleys 40. In addition, means for rotating also includes idler means which comprise idler assembly 42 and means for linking which comprise linking belt 44. Means for radiantly heating comprise radiant heaters 46, such as conventional parabolic radiant heaters as disclosed in pending U.S. Pat. application Ser. No. 684,673 filed on even date herewith by David Rasmussen and Bruce Moen entitled "Dual Parison Heating Reflector and Method". Tapered shank means comprise shank 48, tapered end 50, seals 52 and fluid passage or air passage 54. Preload spring means comprise die spring 56 associated with shank 48. Air cylinder means comprise air cylinder 60, while shock absorber means comprise shock absorbers 62. Fluid reservoir means comprise tube support 64. Carriage assembly means comprise carriage assembly 66, ball bushing 68 and shaft 70. Tapered collar means comprise tapered collar 72 while blow molding cavity means comprise mold 74.

Referring to FIG. 1, a schematic plan view of the device of the present invention is shown. Parisons 10 are mounted on core pins 12 and blow molded to form bottles 11. A stationary platen 17 holds various equipment in a stationary position above indexing dial plate 20. Core pin holders 28 are mounted on indexing dial plate 20 at uniformly spaced indexing locations. Spin belt 30 is positioned around idlers 36 which guide the spin belt in a nearly tangential direction across idler assemblies 42. Spin belt 30 is driven by drive motor 32 and gear reducer 34 across pulleys 40. Air cylinder take-up 38 applies tension to spin belt 30 during operation. Radiant heaters 46 are disposed at various indexing locations such as indexing locations 3, 4, 5, and 6, as shown in FIG. 1. Mold 74 is located above indexing location 7.

Figure 2:
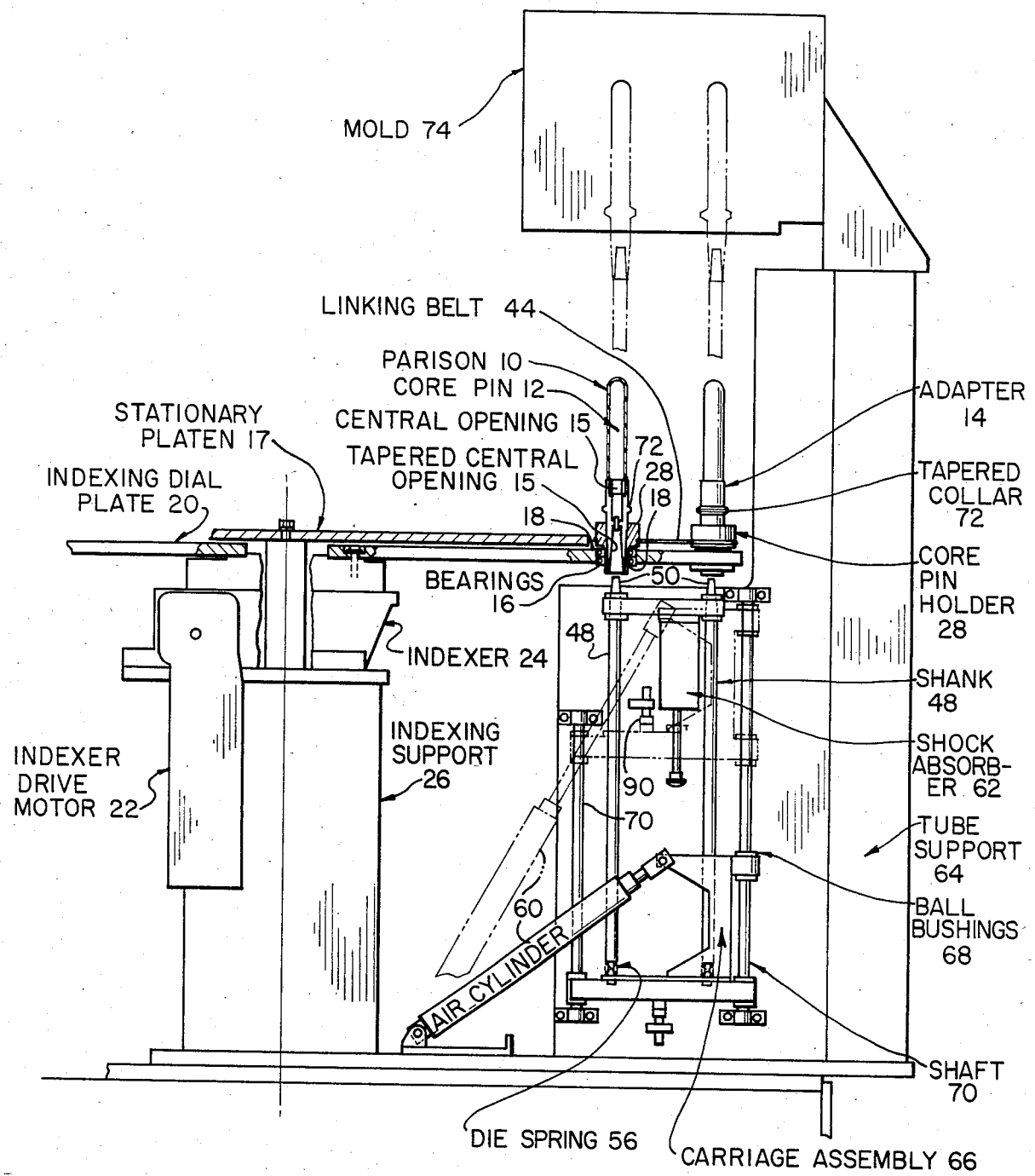
FIG. 2 is a schematic side view of the device illustrated in FIG. 1.

FIG. 2 discloses a side view of the device illustrated in FIG. 1. As shown in FIG. 2, a parison 10 is disposed on a core pin 12 which is mounted in an adapter 14 having a tapered central opening 15 and a tapered surface 88. Core pin holder 28 is coupled to indexing dial plate 20 by bearings 16 and snap rings 18 to allow rotation of the core pin holder 28 in the indexing dial plate 20. Linking belt 44 couples each pair of core pin holders 28 to provide for simultaneous rotation. Shank 48 has a tapered end 50 and is coupled to carriage assembly 66 by way of shaft 58 and die spring 56 which is preloaded to a predetermined force. Air cylinder 60 is coupled to carriage assembly 66. Shock absorber 62 is disposed above the carriage assembly and mounted on support member 63. Adjustable stop is connected to support 63.

Tube support 64 is connected to support 63 and mold 74 and contains a fluid reservoir, e.g., an air reservoir. Carriage assembly 66 is coupled to support 63 by ball bushings 68 and shaft 70. Tapered collar 72 comprises a portion of adapter 14.

Figure 3:
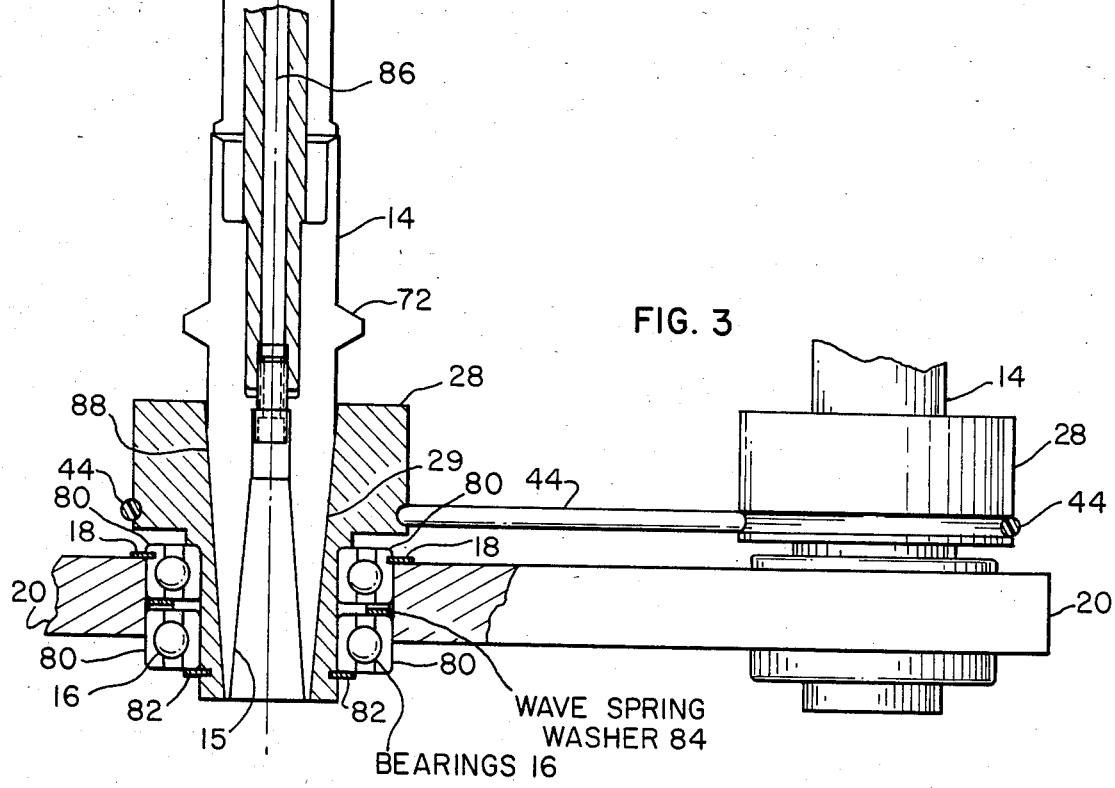
FIG. 3 is a schematic cut-away view of the core pin and core pin holder.

FIG. 3 discloses a detailed cut-away view of indexing dial plate 20 illustrating the manner in which bearings are disposed to couple holder 28 to indexing plate 20. Bearings 16 are disposed in races 80 and are coupled to indexing plate 20 by snap ring 18. Snap ring 82 couples bearings 16 and races 80 to holder 28. Wave spring washer 84 provides a preload between races 80. Holders 28 are linked by linking belt 44 to provide for simultaneous rotation. Core pin holder means 28 has a tapered central opening 29 which mates with the tapered surface 88 of adapter 14 to provide a nonlocking interface between adapter 14 and holder 28. Adapter 14 has a tapered central opening 15 which extends through the adapter 14 into core pin 12. Male taper 72 on adapter 14 mates with a similar female taper (not shown) on mold 74.

Figure 4:
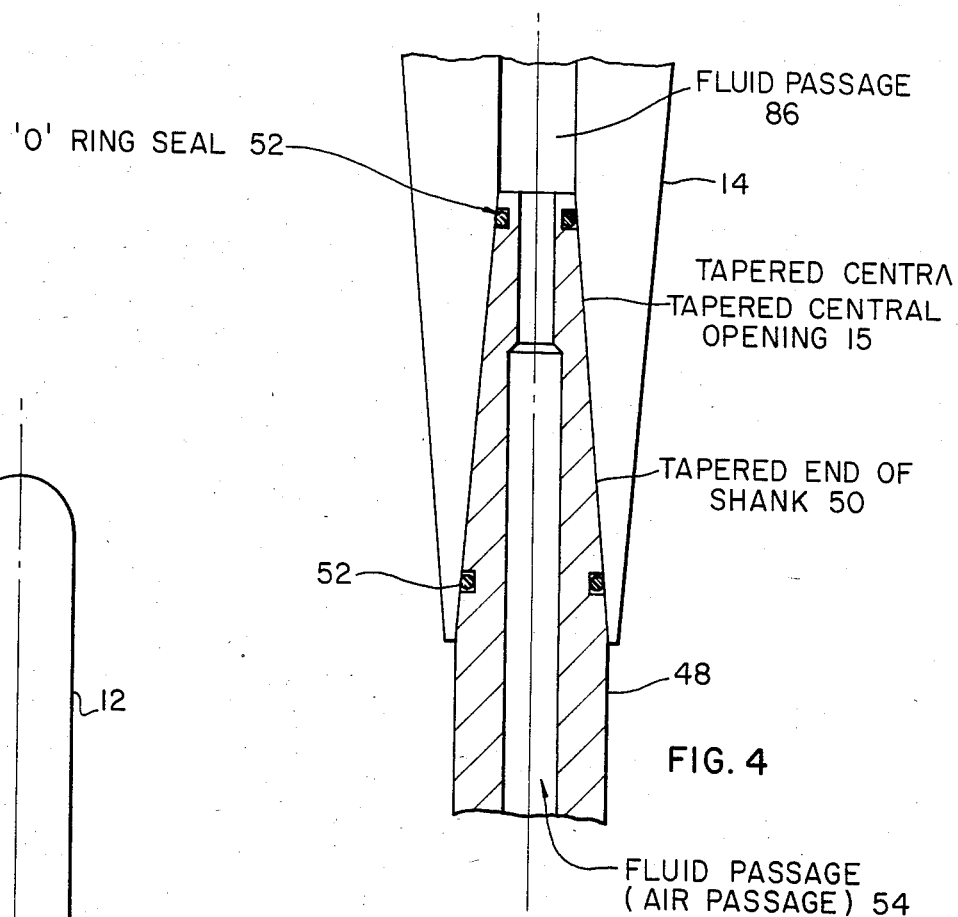
FIG. 4 is a schematic cross-sectional view of the core pin and tapered shank.

FIG. 4 is a schematic cross-sectional diagram of tapered shank 48 and adapter 14. As shown in FIG. 4, tapered shank 48 has a tapered end 50 which mates with the tapered central opening 15 of adapter 14 to provide a nonlocking taper, i.e. a nonlocking interface. Seals 52 are mounted in tapered shank 48 to provide a pressurized seal for fluid passage 54 formed in tapered shank 48 and fluid passage 86 formed in adapter 14.

In operation, indexing drive motor 22 drives indexer 24 which indexes the indexing dial plate 20 in 40 discrete steps to 40 indexing locations in one revolution, such that each step indexes by 9°. Indexing locations 1–10, shown in FIG. 1, illustrate one quadrant of the operation of the device of the present invention. In indexing location 1, parisons 10 are loaded onto core pins 12. At indexing locations 3–6, radiant heaters 46 apply radiant heat to the parisons 10 to heat the parisons to a temperature which is sufficient for blow molding but which is less than the relaxation temperature of the molecules of the parisons which have been previously preferentially oriented by molding with rotation. Idler assemblies 42 are preloaded to apply a predetermined force to spin belt 30 against holders 28 so that holders 28 are rotated in the indexing dial plate 20 in response to movement of the spin belt 30 by drive motor 32. Linking belt 44 couples adjacent holders 28 so that they are rotated simultaneously. The application of radiant heat to parisons 10 while they are rotating substantially uniformly heats the parison, especially if the radiant heat is applied in a fairly uniform manner. Although four radiant heaters 46 are shown in indexing locations 3–6, additional radiant heater can be employed or radiant heaters 46 can be removed from indexing locations, depending upon the intensity of heat produced by radiant heaters 46, duration of the heating cycle. The present invention is designed to rotate the parisons at approximately 300 rpm at the indexing locations indicated for approximately 4 seconds each. Idler assembly 42 has a spring preload such that small movements of the idler wheel of the idler assembly 42 result in a preset application of force by the preload spring. In this manner, the preload force cannot be adjusted by an operator without disassembling the idler assembly 42. The spin belt 30 is moved by a pulley on gear reducers 34 which is activated by spin belt drive motor 32. An air cylinder take-up 38 applies sufficient pressure to spin belt 30 to minimize spin belt slack during operation. The pulleys 40 guide the spin belt around the pulley of air cylinder take-up 38.

When the plastic parison reaches indexing location 7 the blow molding process takes place. Idler 36 at indexing location 7 provides sufficient clearance between spin belt 30 and core pin holder 28 so that the core pin holder 28 does not rotate.

FIG. 2 clearly illustrates the operation of the device at indexing location 7. The carriage assembly 66 and shank 48 are disposed below indexing location 7 as shown in FIG. 2. Air pressure is applied to one cylinder of dual air cylinder 60 to vertically raise carriage assembly 66 on shafts 70 mounted on support 63 using ball bushings 68. Shock absorber 62 progressively decreases the speed of accent of the carriage assembly 66. In the fully raised position, carriage assembly 66 abuts against adjustable stop 90. Shanks 48 are mounted on carriage assembly 66 by way of shaft 58 and die spring 56 which is preloaded to a predetermined pressure. Shanks 48 extend through the central opening 29 of core pin holders 28 at indexing location 7 and lift the core pin 12 and adapter 14 from the nonlocking taper provided between tapered central opening 29 and tapered surface 88. For tapers of approximately 7.5° and greater, a nonlocking interface is provided for most materials. Tapered surface 88 and tapered central opening 29, as well as tapered central opening 15 and tapered end 50 are approximately 10° so as to provide nonlocking interfaces.

Air cylinder 60 raises carriage assembly 66 to a position determined by adjustable stop 90. Adjustable stop 90 is carefully calibrated to cause tapered collar 72 to be spaced a pre-determined distance, e.g. 0.030 inches above a matching female taper in mold 74. Consequently, when mold 74 closes tapered collar 72 causes adapter 14 to be displaced by a predetermined distance, e.g. 0.030 inches downward. Sufficient pressure is applied by air cylinder 60 such that carriage assembly 66 is not displaced, but rather, die spring 56 causes shanks 48 to displace downwardly by the predetermined distance. Since die springs 56 are preloaded to a predetermined pressure and the predetermined distance which shanks 48 are displaced is within the linear range of die springs 56, a predetermined pressure is applied between adapter 14 and shanks 48 determined by the preload pressure on die spring 56. This predetermined pressure is sufficient to seat the tapered end 50 of shanks 48 within the tapered central opening 15 of adapter 14 to form a seal. When tapered shank 48 is seated by the predetermined pressure, e.g. 40 lbs., seals 52 provide a pressurized fluid lock between shank 48 and adapter 14 which exceeds the fluid pressure for blow molding. Pressurized fluid is then applied through fluid passage 54 in shank 48 to fluid passage 86 of adapter 14 and core pin 12 to blow mold the parison mounted on core pin 12.

After blow molding, mold 74 is opened and pressure is applied to a second cylinder within air cylinder 60 to retract carriage assembly 66 and remove core pin 12 and adapter 14 from mold 74. As the carriage assembly is disposed in its down position, adapters 14 are seated in core pin holder 28. Shanks 48 are removed from the central opening 29 of core pin holders 28 and the indexing table is indexed to the next position. At indexing location 10 the blow molded articles are stripped from core pin 12 and the process is started over in the next quadrant. Tube support 64 acts as a air reservoir for blow molding and applying air to air cylinder 60 to raise and lower carriage assembly 66.

Consequently, the present invention provides a device which is capable of reheating and blow molding plastic parisons in a simple and inexpensively implemented system. The present invention employs a nonintegrated system with sufficient isolation to reduce complexity and consequently reduce cost and increase reliability and operating speed of the system. Parisons with a preferential orientation of the molecules can be produced in a separate system which increases the operability of the molding with rotation system. Blow molding in the present system can occur at a desired parison temperature without reducing the operating speed of the automated system while simultaneously providing a stronger quality finished article.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and the practical application of the invention to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device for reheating and blow molding parisons comprising:
    a supporting structure;
    core pin means for holding preheated parisons with a minimum transfer of heat from said parisons by thermal conduction, said core pin means having a central opening for applying air to said parisons for blow molding;
    core pin holder means having a tapered central opening for holding said core pin means by a nonlocking taper;
    means for coupling said core pin holder means to an indexing dial plate to allow rotation of said core pin holder means in said dial plate;
    means for indexing said dial plate in a series of discrete steps to progressive indexing locations;
    means for rotating said core pin holder means;
    means for radiantly heating said preheated parisons while said parisons are rotating to uniformly heat said preheated parisons to a temperature suitable for blow molding;
    tapered shank means which forms a nonlocking taper with said central opening of said core pin means, said tapered shank means having a fluid passage for applying pressurized fluid to said central opening of said core pin means for blow molding;
    carriage assembly means for moving said shank means through said central opening of said core pin holder means to remove said core pin means from said core pin holder and to position said core pin means in a blow mold;
    preloaded spring means for providing a predetermined force between said tapered shank means and said core pin means independent of pressure applied to said carriage assembly means to seat said tapered shank means in said core pin means and provide an air tight seal;
    fluid reservoir means for providing a supply of pressurized fluid for blow molding.

2. The device of claim 1 wherein said fluid reservoir means comprises a portion of said supporting structure of said device for reheating and blow molding parisons.

3. The device of claim 1 wherein said means for rotating comprises:
    a spin belt;
    a spin belt drive motor;
    idler means disposed to position said spin belt on said core pin holder means to rotate said core pin holder means in response to movement of said spin belt by said spin belt drive motor.

4. The device of claim 1 further comprising:
    air cylinder means for raising and lowering said carriage assembly means;
    shock absorber means for controlling the velocity of accent of said carriage assembly means.

5. The device of claim 1 further comprising means for rotating said core pin holder means at predetermined indexing locations of said indexing plate.

6. The device of claim 5 wherein said means for rotating comprises:
    a spin belt;
    a spin belt drive motor;
    idler means disposed to position said spin belt on said core pin holder means to rotate said core pin holder means in response to movement of said spin belt by said spin belt drive motor.

7. In a system for reheating and blow molding parisons, a device comprising:
    a core pin holder having a tapered central opening means for rotating said core pin holder by positioning a moving spin belt on said core pin holder;
    tapered core pin means disposed in said central opening of said core pin holder to form a nonlocking tapered matching interface, said tapered core pin means having a tapered central opening for applying air to said parisons for blow molding;
    shank means having a tapered end which mates with said tapered central opening of said core pin means to provide a nonlocking interface, said shank means having an air passage for applying pressurized air to said core pin means to blow mold parisons;
    carriage assembly means for moving said shank means through said central opening of said core pin holder to remove said core pin means from core pin holder and position said core pin means in a blow mold;
    preloaded spring means for providing a predetermined force between said shank means and said core pin means independent of pressure applied to said carriage assembly means to seat said shank means in said core pin means with said predetermined force and provide an air tight seal.

8. The device of claim 7, wherein parisons to be reheated and blow molded comprise molecules preferentially oriented by molding with rotation and having a relaxation temperature, further comprising means for radiantly heating said parisons to a temperature suitable for blow molding but less than said relaxation temperature of said molecules preferentially orientated by molding with rotation.

9. In a system for reheating and blow molding parisons, a device comprising:
    an indexing plate;
    core pin holder means coupled to said indexing plate to allow rotation of said core pin holder means in said indexing plate, said core pin holder means having a central opening with a first predetermined taper;

core pin means disposed within said core pin holder means having a taper which mates with said predetermined taper of said core pin holder means to provide a nonlocking interface, said core pin means having a central opening for applying air to said parisons for blow molding, said central opening having a second predetermined taper;

shank means having a tapered end which mates with said core pin means to provide a nonlocking interface, said shank means having a fluid passage for applying pressurized fluid to said core pin means to blow mold said parisons;

carriage assembly means for moving said shank means through said core pin holder means to remove said core pin means from said core pin holder means and position said core pin means in a predetermined location;

preload spring means for coupling said shank means to said carriage assembly means;

tapered collar means disposed on said core pin means to move said core pin means from said predetermined location upon closing of a molding cavity having a mating taper to force said core pin means onto said shank means with a predetermined pressure determined by said preload spring means independently of pressure applied to said carriage assembly means.

10. The device of claim 9, wherein parisons to be reheated and blow molded comprise molecules preferentially oriented by molding with rotation and having a relaxation temperature, further comprising means for radiantly heating said parisons to a temperature suitable for blow molding but less than said relaxation temperature of said molecules preferentially orientated by molding with rotation.

11. A device for blow molding plastic parisons comprising:

core pin means for holding preheated parisons with a minimum transfer of heat from said parisons by conduction and providing an air passage through said core pin means to blow mold parisons mounted thereon;

core pin holder means having an opening in which said core pin means are disposed;

a dial plate;

bearing means for coupling said dial plate and said core pin holder means to allow rotation of said core pin holder means in said dial plate;

means for indexing said dial plate in a series of discrete steps to progressive indexing locations;

means for rotating said core pin holder means at predetermined indexing locations at a predetermined rotational speed;

means for radiantly heating plastic parisons disposed on said core pin means while said parisons are rotating at said predetermined indexing locations at said predetermined rotational speed which is sufficiently high to uniformly heat said parisons;

blow molding cavity means disposed in relationship to an additional predetermined indexing location;

tapered shank means for removing said core pin means from said core pin holder means and disposing said core pin means in said blow molding cavity means with sufficient force to provide an air seal between said core pin means and said tapered shank means, said tapered shank means having an air passage for applying pressurized fluid to said core pin means to blow mold said parison when said core pin means is disposed in said blow molding cavity means and for removing said core pin means from said blow molding cavity means and disposing said core pin means in said core pin holder means after blow molding;

reservoir means for supporting said blow molding cavity means and storing pressurized fluid used for blow molding.

12. The device of claim 11 wherein said means for rotating said core pin collar means comprises:

a spin belt;

a spin belt drive motor;

idler means disposed to position said spin belt on said means at said predetermined indexing locations to rotate said core pin holder means in response to movement of said spin belt by said spin belt drive motor.

13. The device of claim 12 further comprising:

means for linking a plurality of core pin holder means to provide simultaneous rotation of said plurality of core pin holder means by application of said spin belt to a single core pin holder means.

14. The device of claim 11 further comprising carriage assembly means for moving said tapered shank means through a central opening in said core pin holder means and positioning said core pin means in said blow molding cavity means;

preload spring means for providing a predetermined force between said tapered shank means and said core pin means independent of pressure applied to said carriage assembly means to seat said shank means in said core pin means with a predetermined force sufficient to provide an air tight seal.

15. A device for blow molding parisons comprising:

a core pin having a central opening for applying air to said parisons and having a surface formed of a material having low thermal conduction properties;

core pin holder means for holding said core pins in a nonlocking taper;

means for radiantly heating said parisons disposed on said core pins to a temperature suitable for blow molding;

means for rotating said core pin holders while said parisons are being radiantly heated to provide uniform heating of said parisons;

means for removing said core pin from said core pin holder means and placing said core pin in a molding cavity for blow molding and disposing said core pin in said core pin holder means after blow molding.

16. A device for blow molding parisons comprising:

a core pin having a central opening for applying air to said parisons;

core pin holder means for releasably holding said core pins;

means for radiantly heating said parisons disposed on said core pins to a temperature suitable for blow molding;

means for rotating said core pin holders while said parisons are being radiantly heated to provide uniform heating of said parisons;

means for removing said core pin from said core pin holder means and placing said core pin in a molding cavity for blow molding and disposing said core pin in said core pin holder means after blow molding.

17. A device for blow molding plastic parisons comprising;
- core pin means for holding preheated parisons with a minimum transfer of heat from said parisons by conduction and providing an air passage through said core pin means to blow mold parisons mounted thereon;
- core pin holder means having an opening in which said core pin means are disposed;
- a dial plate;
- bearing means for coupling said dial plate and said core pin holder means to allow rotation of said core pin holder means in said dial plate;
- means for indexing said dial plate in a series of discrete steps to progressive indexing locations;
- means for rotating said core pin holder means at predetermined indexing locations at a predetermined rotational speed;
- means for radiantly heating plastic parisons disposed on said core pin means while said parisons are rotating at said predetermined indexing locations at said predetermined rotational speed which is sufficiently high to uniformly heat said parisons;
- blow molding cavity means disposed in relationship to an additional predetermined indexing location;
- shank means for removing said core pin means from said core pin holder means and disposing said core pin means in said blow molding cavity means with sufficient force to provide an air seal between said core pin means and said shank means, said shank means having an air passage for applying pressurized fluid to said core pin means to blow mold said parison when said core pin means is disposed in said blow molding cavity means and for removing said core pin means from said blow molding cavity means and disposing said core pin means in said core pin holder means after blow molding;
- reservoir means for supporting said blow molding cavity means and storing pressurized fluid used for blow molding.

* * * * *